3,019,161
METHOD OF TREATING MYCOTIC INFECTIONS
Frank Garai, New York, N.Y., assignor to The Baker
 Castor Oil Company, Jersey City, N.J., a corporation
 of New Jersey
No Drawing. Filed Jan. 28, 1958, Ser. No. 711,546
7 Claims. (Cl. 167—58)

This invention relates to fungus control, i.e., antimycotic agents, useful in the treatment of mammalian dermatomycosis.

The fungi responsible for the more common mycotic infections have been identified as: *Microsporum lanosum*, *Microsporum audouini* and *Epidermophyton floccosum* as the common cause of *Tinea cruris* (ringworm infection of the groin area); *Trichophyton mentagrophytes*, *Trichophyton purpureum*, *Trichophyton tonsurons*, *Trichophyton violaceun* and *Trichophyton interdigitale* as the common cause of tinea pedis (athlete's foot); and *Candida albicans* as the common cause of vaginitis, paronychia and stomatitis (mycotic infections of the vagina, fingernail region and mouth respectively).

Heretofore, treatment of such fungus infections has been by the application of various materials, such as boric acid, salicylic acid, saturated and unsaturated fatty acids, sulfur and zinc compounds. Some of these materials have the disadvantage in that at a concentration sufficiently toxic to destroy the fungus organism, they are irritating to the skin.

Others have the disadvantage that, because these infections are difficult to control, they have been unsuccessful or only moderately successful in the case of severe infections.

It is an object of this invention to provide a superior therapeutic agent for the control of the fungus infections of the type referred to and, particularly, tinea pedis. This agent is effective even in severe cases of the type of fugus infections mentioned.

A further object of this invention is to provide an effective antimycotic agent which when used in quantities large enough to be effective is nevertheless non-toxic to humans and lower animals and non-irritating to the skin.

Another object of this invention is to provide an antimycotic agent capable of forming a solution in water, sufficiently concentrated to be effective and yet be non-irritating to the skin.

A further object of this invention is to provide an antimycotic agent sufficiently soluble in alcohol and alcohol solutions as to be effective and also to be non-irritating to the skin.

Another object of this present invention is to provide an antimycotic agent which can be compounded into dermatologic dusting powder, creams, ointments, solutions or lotions.

A further object of this invention is to provide an antimycotic agent which can be used undiluted.

I have found that heptaldehyde compounds such as heptaldehyde and the alkali metal and alkali earth bisulfite addition product of heptaldehyde are exceptionally effective in inhibiting the growth of, or killing pathogenic fungus infection of the skin and particularly, the fungi of the genus Trichophyton which are responsible for tinea pedis.

Although there has been some disagreement as to the exact structural formula of bisulfite addition compounds of this type, I am inclined to accept the conclusions reached by Laver and Langkammerer (J. Am. Chem. Soc. 57, 2360—1935) who state the formula to be

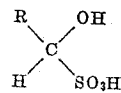

wherein R is a hexyl radical.

However, the invention should not be construed as being predicated upon any structural formula, but relates to the product and its use.

The alkali metal and earth bisulfite addition product of heptaldehyde can be prepared by the following methods:

Shake a 30% ether solution of heptaldehyde with an excess of cold 40% sodium bisulfite solution. Filter off the crystals, and wash first with a little ice water and finally with a mixture of alcohol and ether. Dry in a vacuum.

React heptaldehyde with an aqueous solution of potassium bisulfite, using the potassium bisulfite in slightly molar excess, at 30–70° C. for 5–30 min. Cool to 25° C. or lower and filter the precipitated adduct. Air dry.

The following chart will show the antimycotic properties of heptaldehyde and heptaldehyde bisulfite in aqueous solution or dispersion. In the lower concentration, no emulsifying agent was used. In the .5% weight concentration, Pluronic L62 (Wyandotte Chemicals) was used as a wetting agent which is non-ionic and is represented by the empirical formula $$HO(C_2H_4O)_x(C_3H_6O)_y(C_2H_4O)_zH$$

and is a high molecular weight reaction product obtained by condensing ethylene oxide with a hydrophobic base formed by the condensation of propylene oxide with propylene glycol. However, other emulsifying agents may be used such as sodium alkyl sulfates, sodium alkyl sulfonates, sorbitol mono-oleate, and the other well known emulsifying agents of the anionic, cationic and non-ionic types.

| Organism | Control | Pluronic | Heptaldehyde (97–98% pure) | | Heptaldehyde Bi.ulfite | |
|---|---|---|---|---|---|---|
| | | | 0.02% | 0.5% | 0.01% | 0.5% |
| M. lanosum | xxx | xxx | xxx | 0 | xx | 0 |
| M. audouini | xxx | xxx | xx | 0 | 0 | 0 |
| F. floccosum | xxx | xxx | x | 0 | x | 0 |
| T. mentagrophytes | xxx | xxx | xxx | 0 | 0 | 0 |
| T. purpureum | xxx | xxx | xx | 0 | 0 | 0 |
| T. violaceum | xxx | xxx | xx | 0 | 0 | 0 |
| T. tousurans | xxx | xxx | xx | 0 | 0 | 0 |
| C. albicans | xxx | xxx | xxx | 0 | x | 0 |

Legend: 0—no growth, x—moderate growth, xx—good growth, xxx—strong growth (control).

These tests show that heptaldehyde bisulfite at a 0.5% concentration is an effective fungicidal and fungistatic agent against the dermatophytes responsible for common mycotic infections. At much lower concentrations, heptaldehyde bisulfite still retains its effectiveness and more particularly so against the genus Trichophyton. Heptaldehyde is also effective against all the listed dermatophytes at 0.5% concentration.

The antimycotic agents described above and therapeutic compositions incorporating the agents are non-toxic to humans and lower animals and non-irritating to the skin. While they are effective in low concentrations, it is preferable to increase the concentration when compounding them into a pharmaceutical medium. If desired, they can be applied to the skin undiluted, used separately, or in combination with one another. Heptaldehyde and heptaldehyde bisulfite are effective over a wide range of pH. However, it is preferred to have the therapeutic compositions buffered to a pH range of between 4.5 and 8. Buffering agents which may be used are boric acid, borax, citric acid, etc.

Heptaldehyde and heptaldehyde bisulfite can be incorporated into the standard types of ointment bases. In preparing therapeutic ointments, the amount of active agent used is between 5 and 10% by weight. The following is an example of a water miscible type of ointment base into which they may be incorporated.

Example I

| | |
|---|---|
| Glyceryl mono stearate | 20.0 |
| Glycerine | 15.0 |
| Cetyl alcohol | 2.0 |
| Diethylene glycol monoethyl ether | 5.0 |
| Water | 53.0 |
| Heptaldehyde bisulfite | 5.0 |

A petrolatum based ointment, in which heptaldehyde and heptaldehyde bisulfite can be incorporated, may be made with the following constituents.

Example II

| | |
|---|---|
| Anhydrous lanolin | 45.0 |
| Petrolatum | 45.0 |
| Heptaldehyde | 10.0 |

Heptaldehyde and heptaldehyde bisulfite may also be used in the form of a dermatologic dusting powder by combining them with a diluent powder consisting substantially of talc, fuller's earth or other inert natural diluent powders. In the case of dusting powder, the active ingredient may be used in a higher proportion than when used in ointment form. Heptaldehyde bisulfite comprises about 12%–30%, e.g. 20% by weight of the composition, while heptaldehyde conveniently comprises 1–5% of the composition. Heptaldehyde bisulfite can also be used as a dusting powder in its undiluted state.

Aside from their use in the standard types of dermatological compositions, these antimycotic agents can be incorporated into alcohols and alcohol solutions such as ethyl alcohol, aqueous solution of propylene glycol, etc. Heptaldehyde is completely miscible with ethyl alcohol and heptaldehyde bisulfite can be incorporated into a 70% aqueous ethyl alcohol solution to the extent of 5% at 25° C.

In the case of heptaldehyde bisulfite, there are additional characteristics which enhance its use as a therapeutic agent. It is soluble in water in the amount of approximately 7% by weight at 25° C. This is far in excess of its effective concentration. Because of its low hydrolysis rate at normal or slightly acid pH, no excessive concentration of the H ions are formed. This results in a non-irritating water solution of the antimycotic agent. In this way, the problem of irritation that free fatty acids pose is circumvented. Furthermore, heptaldehyde bisulfite is non-volatile and therefore, is retained longer on the surfaces where it is applied.

The fungus control agents of this invention are compatible with sulfa-type drugs, e.g., sulfanilamide, in the form of powders, which may be used to combat clinical conditions involving additional bacterial complications which may be present as mixed infections in severe cases.

Numerous modifications and variations in the invention described herein will be apparent to those skilled in the art and are within the spirit and scope of the appended claims.

What is claimed is:

1. The method of treating a mycotic infection which comprises applying to the locus of the infection an antimycotic composition comprising as an effective agent a compound selected from the group consisting of heptaldehyde and an addition product of heptaldehyde and a bisulfite selected from the group consisting of alkali metal bisulfites and alkali earth metal bisulfites, in a dispersing medium, the amount of said effective agent in the composition being from about .5% to about 30% by weight.

2. The method of treating a mycotic infection which comprises applying to the locus of the infection an antimycotic agent in accordance with claim 1 wherein the pH of the compound is about 4.5–8.

3. The method of treating a mycotic infection which comprises applying to the locus of the infection an antimycotic agent in accordance with claim 1 wherein said dispersing medium is a water miscible base.

4. The method of treating a mycotic infection which comprises applying to the locus of the infection an antimycotic agent in accordance with claim 1 wherein said dispersing medium is an oil soluble base comprising lanolin and petrolatum.

5. The method of treating a mycotic infection which comprises applying to the locus of the infection an antimycotic agent in accordance with claim 1 wherein said dispersing medium is neutral diluent powder.

6. The method of treating a mycotic infection which comprises applying to the locus of the infection an antimycotic agent in accordance with claim 1 wherein said dispersing medium is water.

7. The method of treating a fungus selected from that group consisting of at least one of *M. lanosum, M. audouini, E. floccosum, T. mentagrophytes, T. purpureum, T. violaceun, T. tousurans, C. albicans*, which comprises applying to the fungus a composition selected from the group consisting of heptaldehyde and heptaldehyde bisulfite.

References Cited in the file of this patent

UNITED STATES PATENTS

| | | |
|---|---|---|
| 1,886,538 | Fanto | Nov. 8, 1932 |
| 2,537,995 | Hall | Jan. 16, 1951 |

OTHER REFERENCES

Strong: Cancer Research, vol. I, 1941, pp. 473–476.

New and Non Official Remedies, 1951, Lippincott Co., Philadelphia, pp. XXVII–XXXI.

Merck Index, 6th ed., Merck and Co. Inc., Rahway, N.J. (1952), p. 490.